United States Patent
Cichosz et al.

(10) Patent No.: US 10,482,154 B2
(45) Date of Patent: Nov. 19, 2019

(54) DISTRIBUTED PROCESSING OF DATA RECORDS

(71) Applicant: International Business Machines Corporation, Armonk, NY (US)

(72) Inventors: Pawel Cichosz, Warsaw (PL); Cezary Dendek, Warsaw (PL); Michal Draminski, Warsaw (PL); Miezyslaw Klopotek, Mazowiecki (PL); Krzysztof Skowronski, Brwinow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 833 days.

(21) Appl. No.: 14/514,795

(22) Filed: Oct. 15, 2014

(65) Prior Publication Data

US 2015/0120758 A1 Apr. 30, 2015

(30) Foreign Application Priority Data

Oct. 29, 2013 (GB) .................................... 1319056.6

(51) Int. Cl.
   *G06F 17/16* (2006.01)
   *G06F 16/25* (2019.01)
(52) U.S. Cl.
   CPC .............. *G06F 17/16* (2013.01); *G06F 16/25* (2019.01)
(58) Field of Classification Search
   CPC .......................... G06F 17/16; G06F 17/30557
   See application file for complete search history.

(56) References Cited

U.S. PATENT DOCUMENTS

| 7,136,852 | B1 | 11/2006 | Sterling et al. |
| 7,174,553 | B1 | 2/2007 | Reed et al. |
| 7,383,234 | B2 | 6/2008 | Iyer et al. |
| 8,209,664 | B2 | 6/2012 | Yu et al. |
| 9,275,353 | B2 * | 3/2016 | Lu .......................... G06Q 10/04 |
| 9,336,302 | B1 * | 5/2016 | Swamy ............... G06F 17/3071 |
| 2010/0107170 | A1 * | 4/2010 | Stehley ................. G06F 9/5038 718/103 |
| 2011/0047172 | A1 * | 2/2011 | Chen ................. G06F 17/30445 707/764 |
| 2012/0191699 | A1 * | 7/2012 | George ............. G06F 16/24554 707/718 |
| 2012/0239612 | A1 * | 9/2012 | George ............. G06F 17/30563 707/602 |

* cited by examiner

*Primary Examiner* — Loc Tran
(74) *Attorney, Agent, or Firm* — Cantor Colburn LLP; Richard Wilhelm (57) ABSTRACT

Embodiments relate to distributed processing of data on a distributed database computer system. An aspect includes distributing rows of an arbitrary matrix to all of a plurality of processing units, wherein a number of the rows is equal to a number of the processing units, wherein one row of the arbitrary matrix is stored in each storage memory. Another aspect includes executing a first user defined function (UDF) on each processing unit, wherein a Cartesian product of each processing parameter matrix and the row of the arbitrary matrix is calculated on each processing unit and the matrix set is stored in the processor memory of each processing unit; and executing a second UDF on each processing unit having at least one data record after the executing of the first UDF, wherein all data records stored in the storage memory of the each processing unit are processed one by one.

18 Claims, 7 Drawing Sheets

DISTRIBUTED PROCESSING OF DATA RECORDS

PRIORITY

This application claims priority to Great Britain Patent Application No. GB 1319056.6, filed Oct. 29, 2013, and all the benefits accruing therefrom under 35 U.S.C. § 119, the contents of which in its entirety are herein incorporated by reference.

BACKGROUND

The present disclosure relates generally to database computer systems, and more specifically, to distributed processing of data records in a database computer system.

Effective processing of data on distributed database computer systems is an everlasting task of the computer science. The distributed database computer systems are pluralities of autonomous processing units, which are interconnected by a computer network. The processing units cooperate in order to perform an assigned task. They can be united in different computational architectures such as share-nothing parallel processing architecture, shared memory parallel processing architecture, and shared storage memory parallel processing architecture. Another example of alternative architecture is a plurality of the processing units configured as autonomous database computer systems and united by a computer network. Each architecture is characterized by its own degree of coupling of the processing units and data exchange functionalities between different processing units. For instance, each processing unit in the share-nothing parallel processing architecture is able to process only data stored in its storage memory. On the other hand a host computer operating all processing units in the share nothing-configuration parallel processing architecture is operable for processing data stored in the storage memory of each processing unit as one integrated database. IBM Netteza data warehouse is an example of the distributed database computer systems having processing units united in a share-nothing parallel processing architecture.

SUMMARY

Embodiments of distributed processing of data on a distributed database computer system are provided. An aspect includes distributing rows of an arbitrary matrix to all of a plurality of processing units, wherein a number of the rows is equal to a number of the processing units, wherein a matrix set is used to calculate a value set corresponding to each data record by using said data record as input, the matrix set comprising at least one processing parameter matrix, the value set comprising at least one calculation value, the distributed database computer system comprising the plurality of processing units connected in a share-nothing parallel processing architecture, wherein each processing unit comprises a processor of the each processing unit, a processor memory of the each processing unit, and a storage memory of the each processing unit, wherein the arbitrary matrix is stored in the distributed data base in a way that one row of the arbitrary matrix is stored in each storage memory, wherein the data records and the matrix set are stored in a distributed database using the storage memories, each processor is being operable for executing user defined functions (UDFs), calculating the value set corresponding to only one data record at a time, executing transaction processing, storing data in the processor memory, and using the data stored in the processor memory for execution of the UDFs within a framework of one transaction. Another aspect includes performing transaction processing in a framework of one transaction by executing a first UDF on each processing unit, wherein a Cartesian product of the each processing parameter matrix and the row of the arbitrary matrix is calculated on each processing unit and as a result thereof the matrix set is stored in the processor memory of each processing unit; and executing a second UDF on each processing unit having at least one data record after the executing of the first UDF, wherein a number of repetitive executions of the second UDF on each processing unit is equal to the number of the data records stored in the storage memory of the each processing unit and all data records stored in the storage memory of the each processing unit are processed one by one, wherein the value set corresponding to the data record is calculated using the matrix set stored in the processor memory of said respective processing unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DRAWINGS

Various embodiments will now be described, by way of example only, with reference to the following drawings in which.

DETAILED DESCRIPTION

Various embodiments of distributed processing of data records provide for a computer implemented method for distributed processing of data records on a distributed database computer system. A matrix set is used to calculate a value set corresponding to each data record by using said data record as input. The matrix set comprises at least one processing parameter matrix. The value set comprises at least one calculation value. The distributed database computer system comprises processing units united in a share-nothing parallel processing architecture. Each processing unit comprises a processor of the each processing unit, a processor memory of the each processing unit, and a storage memory the each processing unit. The data records and the matrix set are stored in a distributed database using the storage memories. Each processor is operable for executing user defined functions, calculating the value set corresponding to only one data record at a time, executing transaction processing, storing data in the processor memory, and using the data stored in the processor memory for execution of the user defined functions within a framework of one transaction. The computer implemented method is a method comprising blocks, wherein each block is performed by one or more computers. The computer implemented method comprises the following.

Rows of an arbitrary matrix are distributed to all processing units. The number of the rows is equal to the number of the processing units. The arbitrary matrix is stored in the distributed data base in a way that one row of the arbitrary matrix is stored in each storage memory. Afterwards the following is executed in a framework of one transaction.

A first user defined function is executed on each processing unit, wherein a Cartesian product of each processing parameter matrix and the row of the arbitrary matrix is calculated on each processing unit and as a result thereof the matrix set is stored in the processor memory of each processing unit.

After the executing of first user defined function a second user defined function is executed on each processing unit having at least one data record. A number of repetitive executions of the second user defined function on each processing unit is equal to the number of the data records stored in the storage memory of the each processing unit. During the repetitive executing of the second user defined function on each processing unit all data records stored in the storage memory of the each processing unit are processed one by one. During the executing of the second user defined function on each processing unit, which storage memory comprises at least one data record, the value set corresponding to one data record is calculated using the matrix set stored in the processor memory of said processing unit, wherein the storage memory of said processing unit comprises said data record.

Further embodiments provide for a program product, in particular a computer readable medium, the computer program product carrying computer executable code for execution by a processor controlling a distributed database computer system, wherein execution of the instructions causes the processor to perform the computer implemented method of the embodiment described above.

Further embodiments provide for a distributed database computer system for distributed processing of data records. A matrix set is used to calculate a value set corresponding to each data record by using said data record as input. The matrix set comprises at least one processing parameter matrix. The value set comprises at least one calculation value. The distributed database computer system comprises: a distributed data base and processing units united in a share-nothing parallel processing architecture. Each processing unit comprises a processor of the each processing unit, a processor memory of the each processing unit, and a storage memory of the each processing unit. Each processor is being operable for: executing user defined function; calculating the value set corresponding to only one data record at a time, executing transaction processing; storing data in the processor memory; and using the data stored in the processor memory for execution of the user defined functions within a framework of one transaction. The distributed computer database system is being operable for: storing the data records and the matrix set in the distributed database using the storage memories, distributing to all processing units rows of an arbitrary matrix having at least two dimensions, wherein a number of the rows is equal to a number of the processing units, wherein the arbitrary matrix is stored in the distributed data base in a way that one row of the arbitrary matrix is stored in each storage memory; executing the following transaction processing in a framework of one transaction.

A first user defined function is executed on each processing unit, wherein a Cartesian product of each processing parameter matrix and the row of the arbitrary matrix is calculated on each processing unit and as a result thereof the matrix set is stored in the processor memory of each processing unit.

After the executing of first user defined function a second user defined function is executed on each processing unit having at least one data record. A number of repetitive executions of the second user defined function on each processing unit is equal to the number of the data records stored in the storage memory of the each processing unit. During the repetitive executing of the second user defined function on each processing unit all data records stored in the storage memory of the each processing unit are processed one by one. During the executing of the second user defined function on each processing unit, which storage memory comprises at least one data record, the value set corresponding to one data record is calculated using the matrix set stored in the processor memory of said processing unit, wherein the storage memory of said processing unit comprises said data record. In such embodiments, a repetitive upload of the matrix set into the processor memory during calculation of each value set may be avoided.

In yet another embodiment the matrix set is used to calculate the value set corresponding to each data record by using said data record as input of a link function of a generalized linear model. The matrix set comprises the following processing parameter matrices: a metadata matrix, a predictor-to-parameter correlation matrix, and a beta coefficient matrix. The metadata matrix determines a type of the link function and a distribution function used in said link function. The predictor-to-parameter correlation matrix determines correlation between each calculation value of the value set and the corresponding data record in said link function. The predictor-to-parameter correlation matrix comprises rows of the predictor-to-parameter correlation matrix and each row of the predictor-to-parameter correlation matrix is used in conjunction with a corresponding beta coefficient of the beta coefficient matrix in said link function.

Further description of the generalized linear model and related terms can be found in the following literature: "PMML in Action: Unleashing the Power of Open Standards for Data Mining and Predictive Analytics," A. Guazzelli, W-Ch. Lin, and T. Jena, CreateSpace Independent Publishing Platform; "Generalized Linear Models," P. McCullagh and J. Nelder, pp. 8-42, Boca Raton: Chapman and Hall/CRC. ISBN 0-412-31760-5; "Introduction to General and Generalized Linear Models," H. Madsen and P. Thyregod, Chapman & Hall/CRC. ISBN 978-1-4200-9155-7 (2011), which is herein incorporated by reference in its entirety.

In yet another embodiment the distributed database is a Standard Query Language (SQL-)distributed database. The first user defined function (UDF) is one or more first SQL UDFs. The second user defined function is a second SQL UDF. Each first SQL UDF is performed by cross joining of the arbitrary matrix with one or more processing parameter matrices within a SQL query of the each first SQL UDF. The second SQL UDF is performed by querying the data record in the distributed database within a SQL query of the second SQL UDF and after the querying of the data record in the distributed database causing the processor of the processing unit to calculate the value set corresponding to said data record within said SQL query of the second SQL UDF, wherein said processing unit comprises the storage memory comprising said data record.

In yet another embodiment the matrix set is used to calculate the value set corresponding to each data record by using said data record as input of link functions. Each link function is a link function of a unique generalized linear model. Each link function generates the corresponding portion of the calculation values of the value set. The matrix set comprises the flowing sets of the processing parameter matrixes: a metadata matrix set, a predictor-to-parameter correlation matrix set, and a beta coefficient matrix set. The metadata matrix set comprises at least one metadata matrix. The predictor-to-parameter correlation matrix set comprises at least one predictor-to-parameter correlation matrix. The beta coefficient matrix set comprises at least one beta coefficient matrix. Each generalized linear model has a unique combination of one metadata matrix of the metadata matrix set, one predictor-to-parameter correlation matrix of the predictor-to-parameter correlation matrix set, and one beta coefficient matrix of the beta coefficient matrix set. The metadata matrix of each generalized linear model determines a type of the link function of the each generalized linear model and a distribution function used in the link function of the each generalized linear model. The predictor-to-parameter correlation matrix of each generalized linear model determines correlation between each calculation value of the portion of the calculation values and the corresponding data record in the link function of the each generalized linear model. The predictor-to-parameter correlation matrix of each generalized linear model comprises rows of said predictor-to-parameter correlation matrix and each row of said predictor-to-parameter correlation matrix is used in conjunction with a corresponding beta coefficient of the beta coefficient matrix of the each generalized linear model in the link function of the each generalized linear model.

In yet another embodiment the data records are linear arrays of data values.

In yet another embodiment at least one processing parameter matrix is a linear array of processing parameter values.

Distributed processing of data on distributed database computer systems is very effective because it comprises splitting the data between different processing units of the distributed database computer system and parallel processing of the data on each processing unit of the distributed database computer system. The distributed database computer systems may have different architectures and different functionalities of the processing units. For instance the processing units can be united in a share nothing parallel processing architecture. The host computer managing the processing units may be connected via a computer network with each processing unit. Although the processing units do not share any computer resources such architecture is effective for supporting of the distributed databases, wherein data records of the distributed database are distributed between the processing units and each portion of the data records is processed on the same processing unit where it is stored on.

Multitasking requirement may be implemented among other measures by implementation of transactional processing on each processing unit. In this case tasks of every user and/or process unit may be performed within unique transactions started by each user and/process. Transaction is a sequence of operations characterized by the features of atomicity, consistency, isolation, and durability. This definition can be further described in greater details as follows. Results of each transaction are kept only when all operations of the each transaction are completely and successfully performed, otherwise any results or modifications of operations of the each transactions are withdrawn completely. If all operations of the transaction were completed successfully then the consistency constraints of the data set processed within the framework of said transaction are kept. All operations of one transaction are not influenced by operations of other transactions and other transactions. The output of each transaction is persistent. The architecture of the processing units may have its own characteristic features as well. For instance, each processing unit may process only one data record of the distributed database within one operation of a transaction at a time. In a case of processing of multiple data records on one processing unit according to the same process parameters, the same process parameters have to be included in (or linked to) every operation. This way of data record processing causes a lot of idle data traffic within the processing unit, since the same information regarding processing parameters is transferred with each data record.

As will be appreciated by one skilled in the art, aspects of various embodiments may be embodied as a system, method or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of various embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing: In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of various embodiments may be written in any combination of one or more programming languages, including an object oriented programming Language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Various embodiments may be used in conjunction with various components of distributed database computer systems that are connected through Internet, providing reduction of traffic between the components of the distributed database computer system such as for instance storage memories and processors.

Various embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will also be noted that each process block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
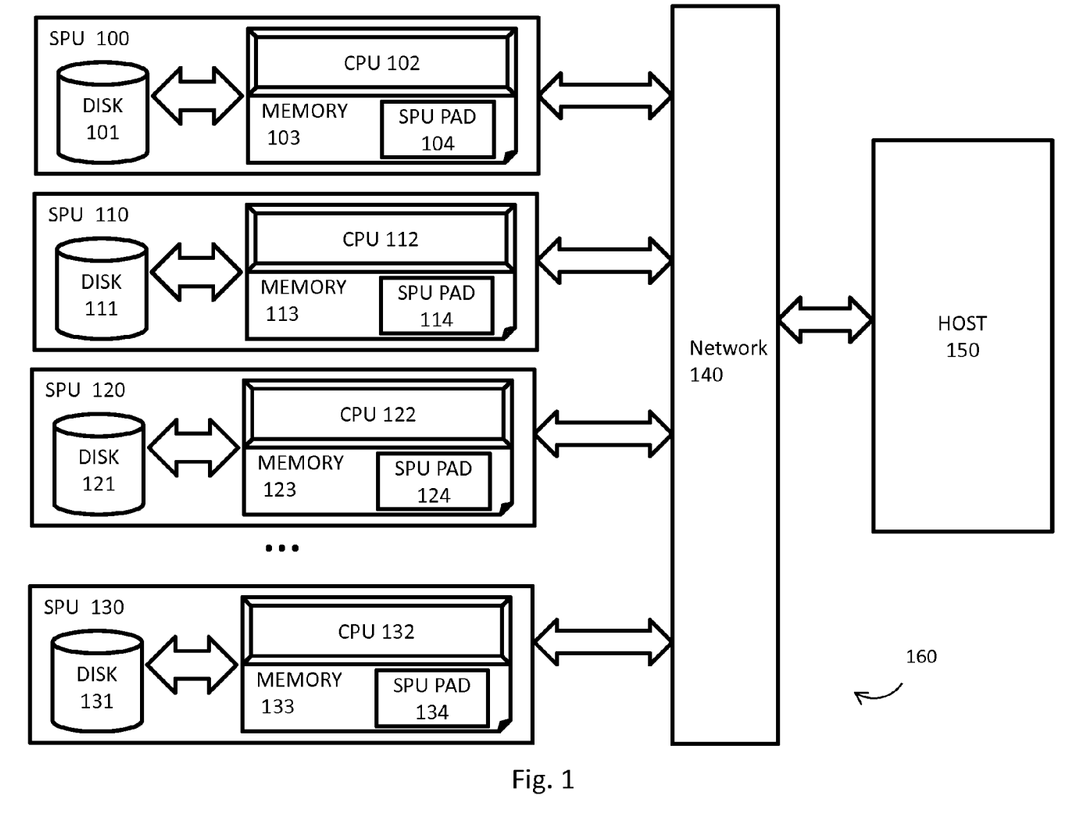
FIG. 1 is a block diagram of a distributed database computer system.

FIG. 1 illustrates a block diagram of a distributed database computer system 160. The distributed database computer system comprises a plurality of the processing units 100, 110, 120, 130 connected by a network 140 with a host computer 150. The distributed database computer system may be an IBM Netezza® computer system. Each processing unit 100; 110; 120; 130; comprises a storage memory 101; 111; 121; 131, a processor 102; 112; 122; 132, a processing unit memory 103; 113; 123; 133, and a processor memory 104; 114; 124; 134. The processing unit may be a Snippet processing unit (SPU) (or Snippet Blade processing node) of the IBM Netezza® computer system. The storage memory can be but is not limited to one or more hard drive disks (HDD), one or more solid states drives (SSD), magnetic tape data storage unit. The processor may be a single or multicore central processing unit (CPU). The processing unit memory may be but is not limited to static random access memory (SRAM) and/or Dynamic Random Access Memory DRAM. The processor memory may be but is not limited to SRAM and/or DRAM. Each processing unit is operable for storing data records in the storage memory. Each processor is operable for executing user defined functions, calculating a value set corresponding to only one data record at a time, executing transaction processing, storing data in the processor memory or in a dedicated portion of the processor memory, and using the data stored in the processor memory or in the portion of the processor memory for execution of the user defined functions within a framework of one transaction. The host computer/server 150 is operable for managing the processing units, distributing workload between them, and managing a distributed database of data records. The processing unit memory may comprise the processor memory. In the Snippet Blade processing node the SPU PAD servers as the aforementioned dedicated portion of the processor memory. The distributed database may use the storage memories of the processing units for storing the data records of the distributed database. In a case when the distributed database is a Standard Query Language-(SQL-) database, the host computer may act a standardized interface to external hosts and applications. It may compile SQL queries into executable code segments (snippets), create optimized query plans, and distribute the executable code segments to the processing units for execution. It handles also user-defined functions (UDF) that is user-supplied code that is run by the database system in response to SQL invocation syntax.

In programs or environments having functions as built-in components of these programs or environments, a UDF is a function supplied by the user of said program or environment, which is used in the very same way (from the point of view of the syntax and context) as the built-in functions. They are used in order to provide new types of data processing actions that are not currently available with the built-in functions. For example they may be interpreted of as the user-defined counterparts of built-in SQL Functions (like upper( ), sqr( ), or length( )) and are run by the database system in response to SQL invocation syntax. In SQL databases a user may use a UDF invocation anywhere inside a SQL statement where the user may use a built-in function, which includes restrictions (WHERE clauses), join conditions, projections (select from lists), and HAVING conditions.

The value set calculated by the processing unit may comprise one or more calculation values calculated using a set of rules. Each value set is calculated by using a corresponding data record as an input. The set of rules may be a matrix set comprising one or more processing parameter matrices.

The matrix set may be as set of processing parameter matrixes of a generalized linear model. It may comprise the following processing parameter matrices: a metadata matrix, a predictor-to-parameter correlation matrix, and a beta coefficient matrix. The metadata matrix determines a type of the link function and a distribution function used in said link function. The predictor-to-parameter correlation matrix determines correlation between each calculation value of the value set and the corresponding data record in said link function. The predictor-to-parameter correlation matrix comprises rows and each row is used in conjunction with a corresponding beta coefficient of the beta coefficient matrix in said link function. In this case each value set is calculated by using the link function of the generalized linear model, wherein the corresponding data record is used as an input of the link function.

As is will be illustrated below the data records may be linear arrays of data values and processing parameter matrices may be linear or multidimensional arrays of processing parameter values.

The aforementioned case can be expanded for performing parallel calculation of calculation values of different generalized linear models. Each generalized model may be based on unique processing parameter matrices or share of portion of the processing matrixes with another generalized linear model. In this case the matrix set is used to calculate the value set corresponding to each data record by using said data record as input of link functions, wherein each link function is a link function of a unique generalized linear model. Each link function generates the corresponding portion of the calculation values of the value set. The matrix set comprises the flowing sets of the processing parameter matrixes: a metadata matrix set, a predictor-to-parameter correlation matrix set, and a beta coefficient matrix set. The metadata matrix set comprises at least one metadata matrix. The predictor-to-parameter correlation matrix set comprises at least one predictor-to-parameter correlation matrix. The beta coefficient matrix set comprises at least one beta coefficient matrix. Each generalized linear model has a unique combination of one metadata matrix of the metadata matrix set, one predictor-to-parameter correlation matrix of the predictor-to-parameter correlation matrix set, and one beta coefficient matrix of the beta coefficient matrix set. The metadata matrix of each generalized linear model determines a type of the link function of the each generalized linear model and a distribution function used in the link function of the each generalized linear model. The predictor-to-parameter correlation matrix of each generalized linear model determines correlation between each calculation value of the portion of the calculation values and the corresponding data record in the link function of the each generalized linear model. The predictor-to-parameter correlation matrix of each generalized linear model comprises rows and each row is used in conjunction with a corresponding beta coefficient of the beta coefficient matrix of the each generalized linear model in the link function of the each generalized linear model.

Figure 2:
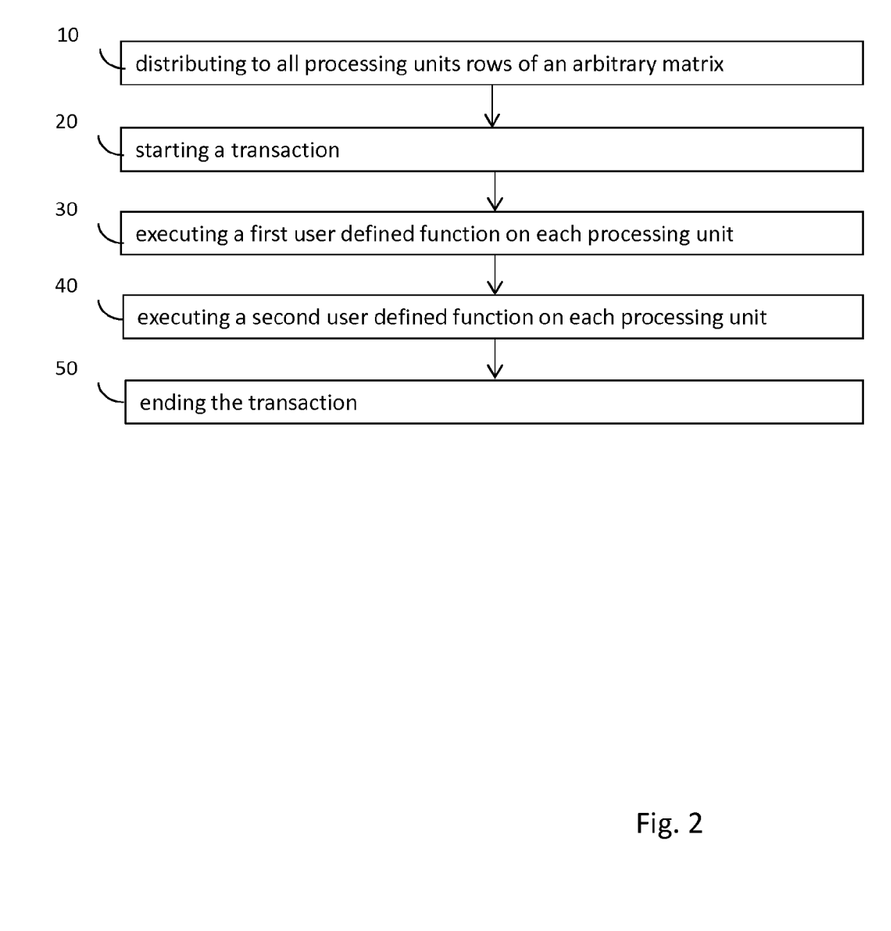
FIG. 2 is a flowchart of process blocks for distributed processing of data records on a distributed database computer system.
Figure 3:
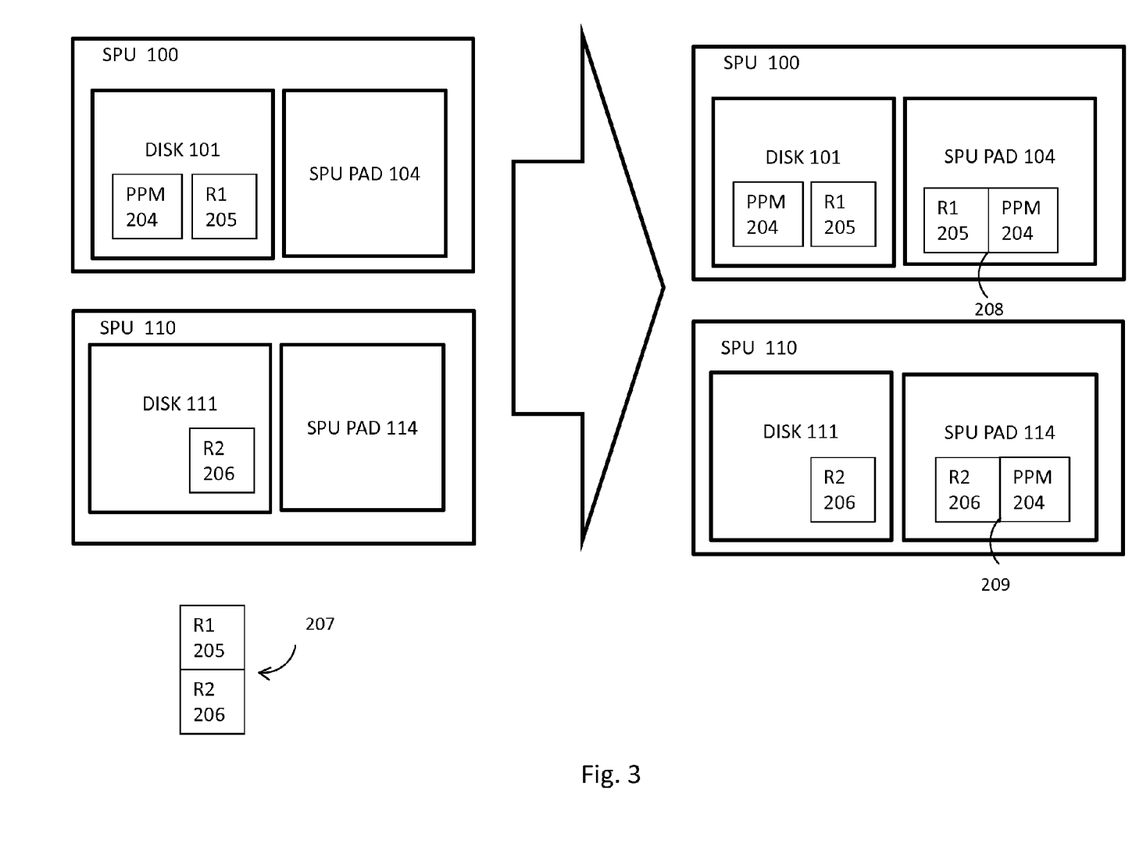
FIG. 3 is a block diagram of calculation of a Cartesian product of an arbitrary matrix and a processing parameter matrix on a distributed database computer system.

FIG. 2 is a flowchart of process blocks for distributed processing of the data records on the distributed database computer system. In a processing block 10 rows of an arbitrary matrix are distributed to the processing units. The arbitrary matrix has at least two dimensions. The rows of the arbitrary matrix are distributed to all processing units. A number of the rows is equal to a number of the processing units. The arbitrary matrix is stored in the distributed data base in a way that one row of the arbitrary matrix is stored in each storage memory. The result of this process block is illustrated on FIG. 3. The left part of the FIG. 3 illustrates two processing units 100 and 110 of a distributed database computer system comprising only these two processing units. The arbitrary matrix 207 comprises two rows R1 and R2 having reference numerals 205 and 206 correspondingly. As a result of execution the process block 10 the storage memory 101 of the processing unit 100 comprises the row 205 of the arbitrary matrix and the storage memory 111 of the processing unit 110 comprises the row 206 of the arbitrary matrix 207.

In a process block 20 the transaction is stared and in the process block 50 the transaction is ended. Process blocks 30 and 40 are performed in a framework of the transaction.

A first user defined function (UDF) is executed on each processing unit in the process block 30. A Cartesian product of each processing parameter matrix and the row of the arbitrary matrix is performed on each processing unit. As a result thereof the matrix set is stored in the processor memory of each processing unit. The right part of the FIG. 3 illustrates a result of the process block 30. The processor memory 104 of the processing unit 100 comprises a Cartesian product of the row 205 and a processing parameter matrix 204. The processor memory 114 of the processing unit 110 comprises a Cartesian product of the row 206 and the processing parameter matrix 204. The processing parameter matrix 204 was stored in the storage memory 101 before the execution of the process block 30. Alternatively the processing parameter matrix 204 could have been split into two sub-matrices. One sub-matrix could have been stored in the storage memory 101 and another sub-matrix could have been stored in the storage memory 111 before execution of the process block 30.

In the process block 40 a second user defined function is repetitively executed on each processing unit, which storage memory comprises at least one data record. A number of repetitive executions of the second user defined function on each processing unit is equal to the number of the data records stored in the storage memory of the each processing unit. During the repetitive executing of the second user defined function on each processing unit all data records stored in the storage memory of the each processing unit are processed one by one. During the executing of the second user defined function on each processing unit, which storage memory comprises at least one data record, the value set corresponding to one data record is calculated using the matrix set stored in the processor memory of said processing unit, wherein the storage memory of said processing unit comprises said data record.

The distributed database may be a SQL-distributed database. The first UDF may be one or more first SQL UDFs. The second USF may be a second SQL UDF. Each first SQL UDF is performed by cross joining of the arbitrary matrix with one or more processing parameter matrices within a SQL query of the each first SQL UDF. The second SQL UDF is performed by querying the data record in the distributed database within a SQL query of the second SQL UDF and after the querying of the data record in the distributed database causing the processor of the processing unit to calculate the value set corresponding to said data record within said SQL query of the second SQL UDF, wherein said processing unit comprises the storage memory comprising said data record. The functioning of the first and second SQL UDFs can be readily understood on examples illustrated on FIGS. 4-7.

Figure 4:
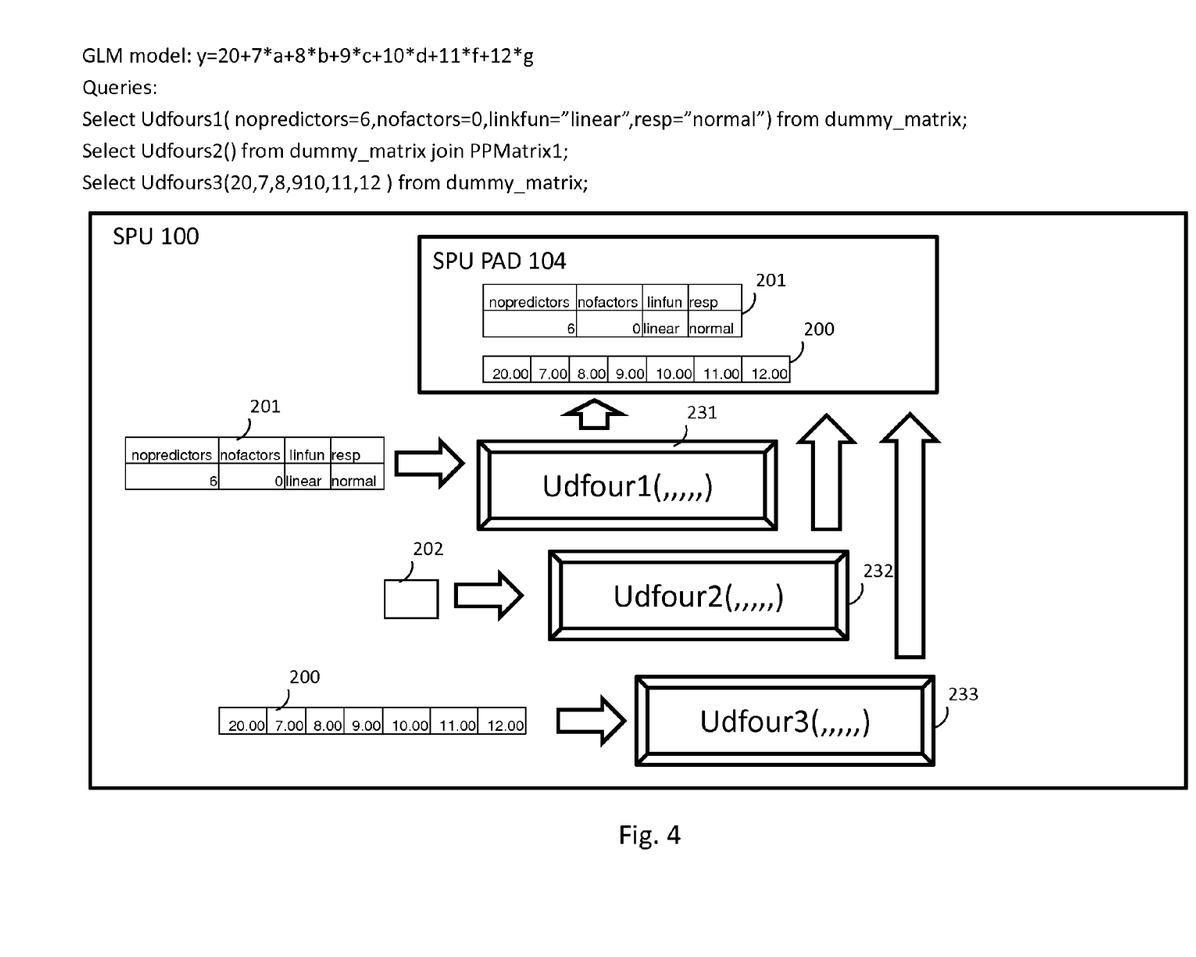
FIG. 4 is a block diagram illustrating calculating of a Cartesian product of a dummy matrix with a metadata matrix, a predictor-to-parameter matrix, and a beta coefficient matrix of a generalized linear model on a processing unit of a distributed database computer system.
Figure 5:
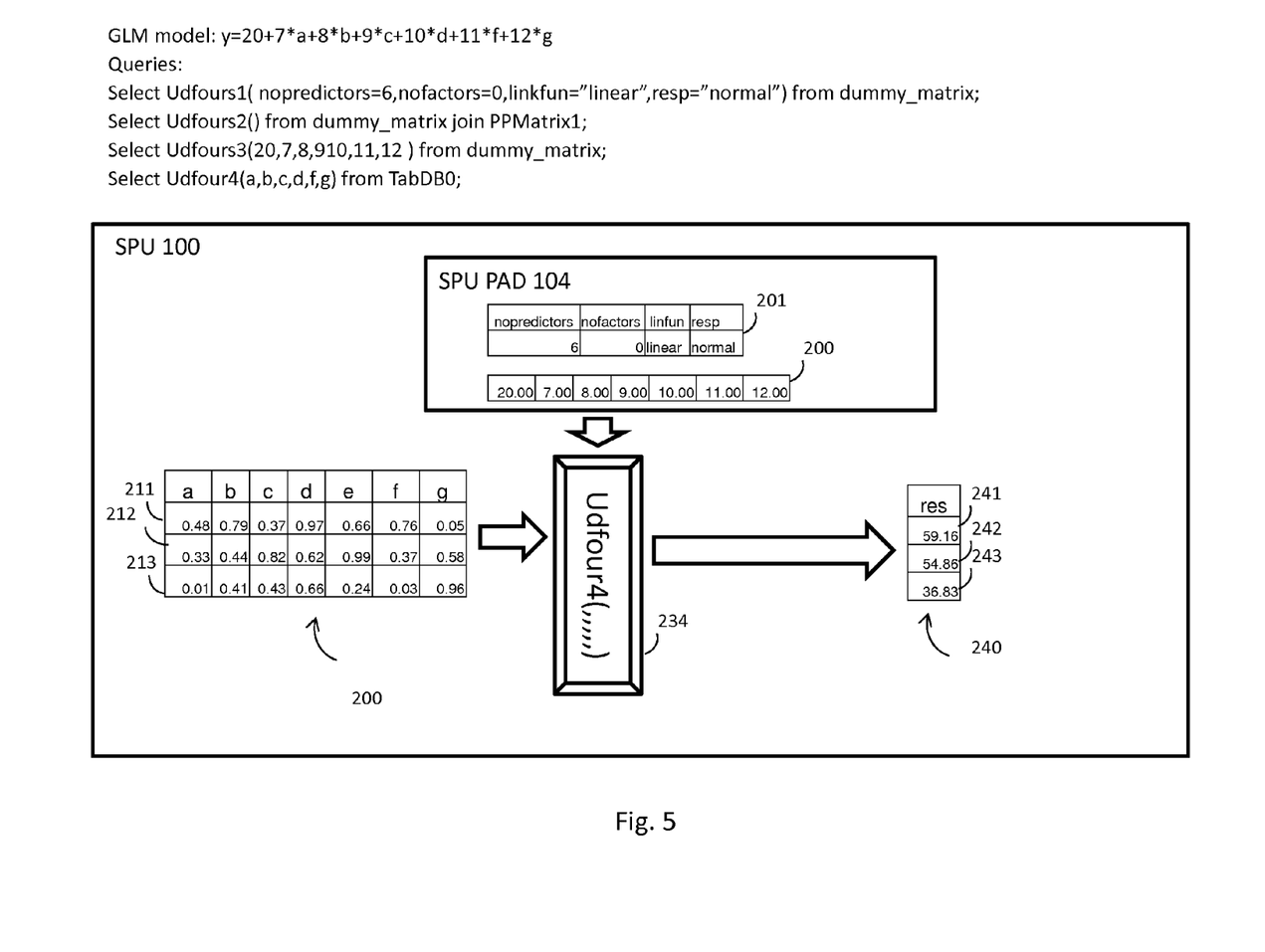
FIG. 5 is a block diagram illustrating calculating of values corresponding to data records using the generalized linear model on the processing unit of the distributed database computer system.

In order to make the following examples more illustrative the arbitrary matrix is further a dummy matrix (or table) without any limitation of the meaning of this feature. The only one premise of the dummy matrix is that it has a number of cells in one of dimensions of the dummy matrix equal to the number of processing units. The dummy matrix may be a two dimensional matrix, wherein each cell of the dummy matrix is filled with arbitrary information. A simple implementation of the dummy matrix may be a matrix of binary values, wherein the matrix of the binary values has one column and a number of rows being equal to a number of processing units. FIGS. 4 and 5 illustrate calculation of the values using the corresponding data records according to a generalized linear model (GLM). The generalized linear model is based on a simple linear formula: $y=20+7*a+8*b+9*c+10*d+11*f+12*g$. The "y" equals to the calculation value 241, 242, 243 of corresponding data record 211, 212, 213. The parameters "a"-"g" are predictors of the generalized linear model. The set of predictors is equal to one of the data records 211, 212, 213 during calculation of calculation values corresponding to the data records. The data records and the processing parameter matrices 201, 200, 202 are stored in the storage memories of the processing units. The processing parameter matrix 201 is a metadata matrix. It specifies the number of predictors equal to 6, since there are 6 predictors "a"-"g". Since the power of all predictors is equal to unity the number of factor parameter "nofactors" is equal to zero. Since the formula is linear, the parameter determining the type of the link function "linfun" is linear. Since the response of the generalized linear model is determined solely by linear regression (formula) the response parameter "resp" is normal, i.e. this random variable is distributed according to normal distribution. The processing parameter matrix 202 is a predictor-to-parameter correlation matrix of the generalized linear model. Since the link function of the generalized linear model is a linear regression without any parameterization the predictor-to-parameter matrix is empty. Nevertheless it is included in this example for the sake of integrity. The processing parameter matrix 200 is a beta coefficient matrix, wherein coefficients of the linear regression are stored. Those skilled in the art will understand this description in every detail.

In a case when the distributed database is an SQL-distributed database the process block 10 of the flowchart illustrated on the FIG. 2 can be formulated as follows using the SQL queries:

```
CREATE TABLE DUMMY_TABLE (DSID INT) DISTRIBUTE ON (DSID);
    INSERT INTO DUMMY_TABLE VALUES (1),(2),(3),(4),...,(100);
```

In this example the dummy matrix is distributed over 100 processing units. Those skilled in the art will understand this pseudo code in every detail.

The process block 30 of the flowchart illustrated on the FIG. 2 can be formulated as follows by using the following SQL queries:

```
Select Udfours1(nopredictors=6,nofactors=0,linkfun="linear", resp="normal") from dummy_matrix;
    Select Udfours2( ) from dummy_matrix join PPMatrix1;
    Select Udfours3(20,7,8,910,11,12 ) from dummy_matrix;
```

-continued

The Udfours1 function performs calculation of a Cartesian product of the metadata matrix 201 with the row of the dummy matrix on each processing unit. As a result the metadata matrix is stored in the processor memory 104 of each processing unit 100 (FIG. 4).

The Udfours2 function performs calculation of a Cartesian product of the predictor-to-parameter matrix 202 with the row of the dummy matrix on each processing unit. This function has no input values because the predictor-to-parameter matrix (PPMatrix1) is empty in this example. As a result the predictor-to-parameter matrix is stored in the processor memory 104 of each processing unit 100 (FIG. 4).

The Udfours3 function performs calculation of a Cartesian product of the beta coefficient matrix 200 with the row of the dummy matrix on each processing unit. As a result the beta coefficient matrix is stored in the processor memory 104 of each processing unit 100 (FIG. 4).

The process block 40 of the flowchart illustrated on the FIG. 2 can be formulated as follows by using the following SQL query:

Select Udfour4(a,b,c,d,f,g) from TabDB0.

The Udfour4 function performs calculation of a matrix 240 of the calculation values 241-243 by querying the database TAbDB0 comprising the table 200 of the data records 211-213. (FIG. 5).

If for the calculation according to the GLM model illustrated on the FIGS. 4 and 5 a prior art approach would be applied, then the following function would be used: Select Udftrad(20,7,8,9,10,11,12,a,b,c,d,f,g) from TabDB0. Those skilled in the art will clearly understand that the beta coefficients are transmitted to the processing unit for the calculation of each calculation value in the aforementioned example.

Figure 6:
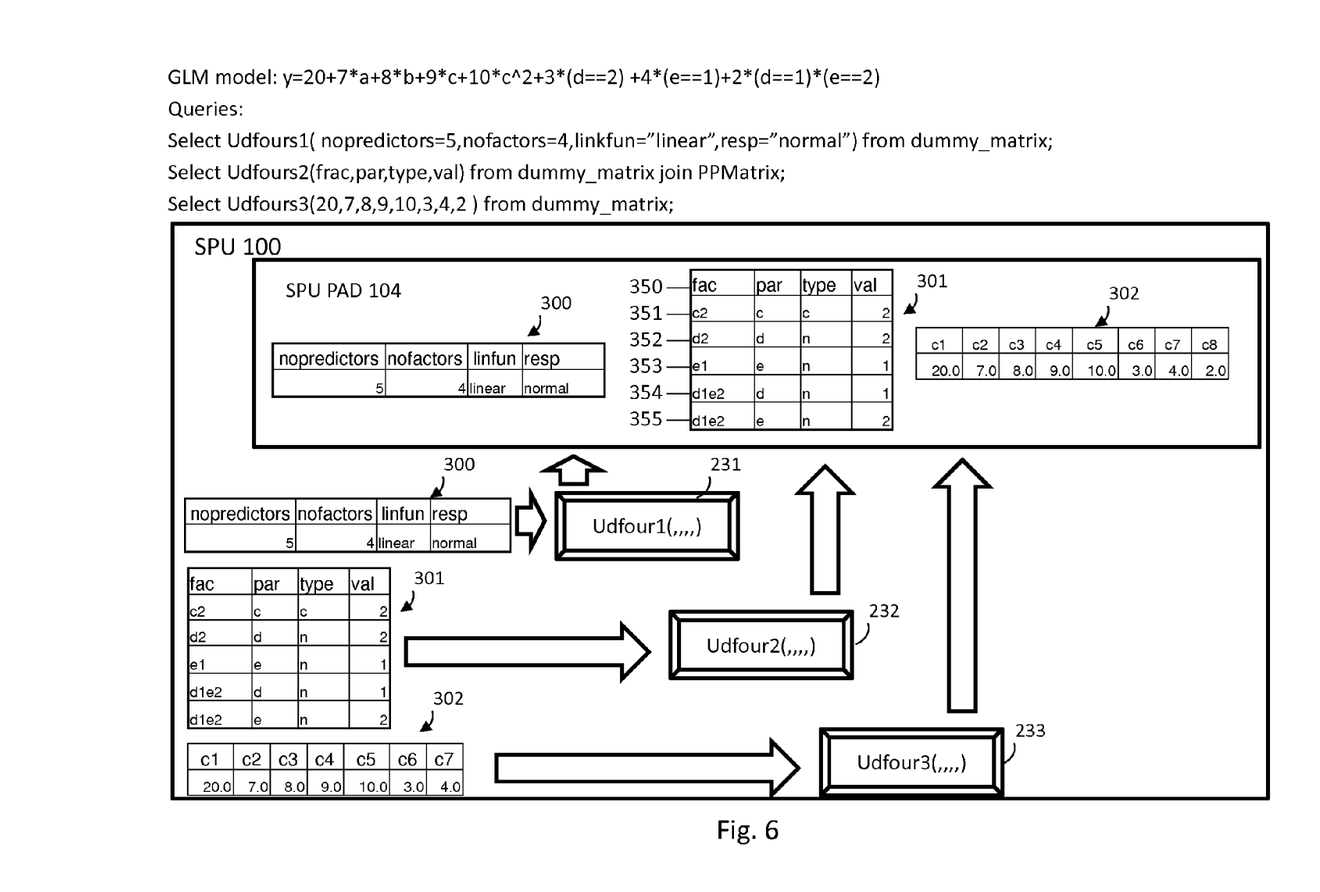
FIG. 6 is a block diagram illustrating calculating of a Cartesian product of a dummy matrix with a metadata matrix, a predictor-to-parameter matrix, and a beta coefficient matrix of another generalized linear model on the processing unit of the distributed database computer system.
Figure 7:
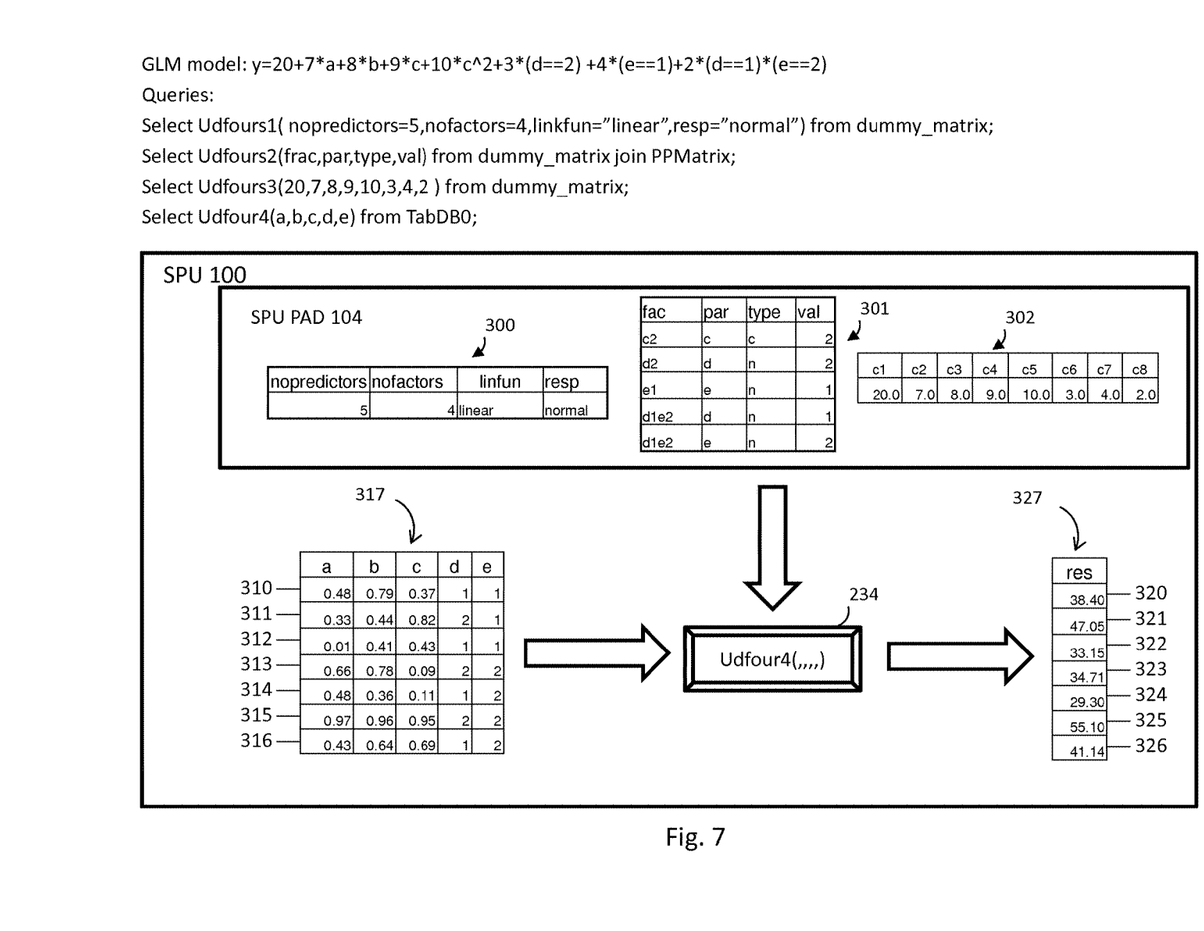
FIG. 7 is a block diagram illustrating calculating of values corresponding to data records using the another generalized linear model on the processing unit of the distributed database computer system.

FIGS. 6 and 7 illustrate calculation of the values using the corresponding data records according to another generalized linear model (GLM). The generalized linear model is based on a formula (link function): $y=20+7*a+8*b+9*c+10*c^2+3*(d==2)+4*(e==1)+2*(d==1)*(e==2)$. The "y" equals to the calculation value 320-326 (table 327) of corresponding data record 310-316 (table 317). The parameters "a"-"e" (table 317) are predictors of the generalized linear model. The set of predictors is equal to one of the data records 310-316 during calculation of calculation values corresponding to the data records. The symbol "^" indicates that parameter "c" has to be risen to the power of two. The expression "d==2" means that only in case when "d" equals 2, 3 will be added during calculation according to the formula. The expression "e==2" means that only in case when "e" equals 1 4 will be added during calculation according to the formula. The expression $2*(d==1)*(e==2)$ means that only in case when "d" equals 1 and "e" equals 2, 4 will be added during calculation according to the formula.

The data records 317 and the processing parameter matrices 301, 300, 302 are stored in the storage memories of the processing units. The processing parameter matrix 300 is a metadata matrix. It specifies the number of predictors "nopredictors" equal to 5, since there are 5 predictors "a"-"e". The number of additional factors "nofactors" is equal to 4, since there are 4 additional factors: $c^2$, (d==2), (e==1), (d==1)*(e==2). Since the formula is linear, the parameter determining the type of the link function "linfun" parameter is assigned the value "linear". Since the response of the generalized linear model is determined solely by linear regression (formula) the response parameter "resp" is set to "normal", i.e. this random variable is distributed according to normal distribution. The processing parameter matrix 301 is a predictor-to-parameter correlation matrix of the generalized linear model. It comprises 4 columns (350). The first column "fac" specifies names/combinations of names of factors. The second column "par" specifies the names of the parameters. The third column "type" specifies types of attributes. The fourth column "val" specifies values of attributes for discrete attributes and exponent for continuous attributes. The row 351 describes that the parameter "c" has the type "c" (continuous) and it has to be risen to the power of 2 since its value equals to 2. The row 352 specifies that the factor "d2" having the type "n" (nominal) and being equal to 2. The factor "d2" is set to 1 when the attribute "d" equals 2 and in all other cases the factor "d2" equals 0. The row 353 specifies that the factor "e1" having the type "n" (nominal) and being equal to 2. The factor "e1" is set to 1 when the attribute "e" equals 1 and in all other cases the factor "e1" equals 0. The rows 354 and 355 together specify the factor "d1e2" having type "n". The factor "d1e2" equals 1 when attribute "d" equals 1 and attribute "e" equals 2 and in all other cases the factor "d1e2" equals 0. The processing parameter matrix 302 is a beta coefficient matrix, wherein coefficients of the formula are stored. Those skilled in the art will understand this description in every detail.

In a case when the distributed database is an SQL-distributed database the process block 10 of the flowchart illustrated on the FIG. 2 can be formulated as follows using the SQL queries:

```
CREATE TABLE DUMMY_TABLE (DSID INT) DISTRIBUTE ON (DSID);
    INSERT INTO DUMMY_TABLE VALUES (1),(2),(3),(4),...,(100);
```

In this example the dummy matrix is distributed over 100 processing units. Those skilled in the art will understand this pseudo code in every detail.

The process block 30 of the flowchart illustrated on the FIG. 2 can be formulated as follows by using the following SQL queries:

```
Select Udfours1(nopredictors=5,nofactors=4,linkfun="linear",
resp="normal") from dummy_matrix;
    Select Udfours2(frac,par,type,val) from dummy_matrix join PPMatrix;
    Select Udfours3(20,7,8,9,10,3,4,2 ) from dummy_matrix;
```

The Udfours1 function performs calculation of a Cartesian product of the metadata matrix 300 with the row of the dummy matrix on each processing unit. As a result the metadata matrix is stored in the processor memory 104 of each processing unit 100 (FIG. 5).

The Udfours2 function performs calculation of a Cartesian product of the predictor-to-parameter matrix 301 with the row of the dummy matrix on each processing unit. As a result the predictor-to-parameter matrix is stored in the processor memory 104 of each processing unit 100 (FIG. 5).

The Udfours3 function performs calculation of a Cartesian product of the beta coefficient matrix 302 with the row of the dummy matrix on each processing unit. As a result the beta coefficient matrix is stored in the processor memory 104 of each processing unit 100 (FIG. 4).

The process block 40 of the flowchart illustrated on the FIG. 2 can be formulated as follows by using the following SQL query:

Select Udfour4(a,b,c,d,e) from TabDB0.

The Udfour4 function performs calculation of the matrix 327 of the calculation values 320-326 by querying the database TAbDB0 comprising the table 317 of the data records 310-316. (FIG. 7).

If for the calculation according to the GLM model illustrated on the FIGS. 6 and 7 a prior art approach would be applied, then the following function would be used: Select Udftrad(20,7,8,9,10,3,4,2,a,b,c,c2,d2,e1,d1e2) from TabDB0. Those skilled in the art will clearly understand that the beta coefficients and predictor-to-parameter coefficients are transmitted to the processing unit for the calculation of each calculation value in the aforementioned example. Those skilled in the art will understand these SQL queries in every detail.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A computer implemented method for distributed processing of data on a distributed database computer system, the computer implemented method comprising:

distributing rows of an arbitrary matrix to all of a plurality of processing units, wherein a number of the rows is equal to a number of the processing units, wherein a matrix set is used to calculate a value set corresponding to each data record by using said data record as input, the matrix set comprising at least one processing parameter matrix, the value set comprising at least one calculation value, the distributed database computer system comprising the plurality of processing units connected in a share-nothing parallel processing architecture, wherein each processing unit comprises a processor of the each processing unit, a processor memory of the each processing unit, and a storage memory of the each processing unit, wherein the arbitrary matrix is stored in the distributed database in a way that one row of the arbitrary matrix is stored in each storage memory, wherein the data records and the matrix set are stored in a distributed database using the storage memories, each processor is being operable for executing user defined functions (UDFs), calculating the value set corresponding to only one data record at a time, executing transaction processing, storing data in the processor memory, and using the data stored in the processor memory for execution of the UDFs within a framework of one transaction; and performing transaction processing in a framework of one transaction by:

executing a first UDF on each processing unit, wherein a Cartesian product of the each processing parameter matrix and the row of the arbitrary matrix is calculated on each processing unit and as a result thereof the matrix set is stored in the processor memory of each processing unit; and executing a second UDF on each processing unit having at least one data record after the executing of the first UDF, wherein a number of repetitive executions of the second UDF on each processing unit is equal to the number of the data records stored in the storage memory of the each processing unit and all data records stored in the storage memory of the each processing unit are processed one by one, wherein the value set corresponding to the data record is calculated using the matrix set stored in the processor memory of said respective processing unit, wherein the matrix set is used to calculate the value set corresponding to each data record by using said data as input of a link function of a generalized linear model;

wherein the at least one processing parameter matrix of the matrix set includes at least the following set of processing parameter matrices: a predictor-to-parameter correlation matrix and a beta coefficient matrix, wherein the predictor-to-parameter correlation matrix determines as correlation between each calculation value of the value set and a corresponding data record in said link function, wherein the predictor-to-parameter correlation matrix comprises rows of the predictor-to-parameter correlation matrix and each row of the predictor-to-parameter correlation matrix is used in conjunction with a corresponding beta coefficient of the beta coefficient matrix in said link function.

2. The computer implemented method of claim 1, wherein the matrix set further comprises the following processing parameter matrix: a metadata matrix, wherein the metadata matrix determines a type of the link function and a distribution function used in said link function.

3. The computer implemented method of claim 1, wherein the distributed database is a Standard Query Language (SQL) distributed database, wherein the first UDF is one or more first SQL UDFs, wherein the second UDF is a second SQL UDF, wherein each first SQL UDF is performed by cross joining of the arbitrary matrix with one or more processing parameter matrices within a SQL query of the each first SQL UDF, wherein the second SQL UDF is performed by querying the data record in the distributed database within a SQL query of the second SQL UDF and after the querying of the data record in the distributed database causing the processor of the processing unit to calculate the value set corresponding to said data record within said SQL query of the second SQL UDF, wherein said processing unit comprises the storage memory comprising said data record.

4. The computer implemented method of claim 1, wherein the matrix set is used to calculate the value set corresponding to each data record by using said data record as input of link functions, wherein each link function is a link function of the generalized linear model, wherein each link function generates a corresponding portion of calculation values of the value set, wherein the matrix set comprises the following sets of processing parameter matrices: a metadata matrix set, a predictor-to-parameter correlation matrix set, and a beta coefficient matrix set, wherein the metadata matrix set comprises at least one metadata matrix, wherein the predictor-to-parameter correlation matrix set comprises at least one predictor-to-parameter correlation matrix, wherein the beta coefficient matrix set comprises at least one beta coefficient matrix, wherein each generalized linear model has a unique combination of one metadata matrix of the metadata matrix set, one predictor-to-parameter correlation matrix of the predictor-to-parameter correlation matrix set, and one beta coefficient matrix of the beta coefficient matrix set, wherein the one metadata matrix of each generalized linear model determines a type of the link function of the each generalized linear model and a distribution function used in the link function of the each generalized linear model, wherein the one predictor-to-parameter correlation matrix of each generalized linear model determines a correlation between each calculation value of the portion of the calculation values and a corresponding data record in the link function of the each generalized linear model.

5. The computer implemented method of claim 1, wherein the data records are linear arrays of data values.

6. The computer implemented method of claim 1, wherein the at least one processing parameter matrix is a linear array of processing parameter values.

7. A computer program product for distributed processing of data on a distributed database computer system, the computer program product comprising a non-transitory computer readable storage medium having program instructions embodied therewith, the program instructions executable by a processor to cause the processor to:

distribute rows of an arbitrary matrix to all of a plurality of processing units, wherein a number of the rows is equal to a number of the processing units, wherein a matrix set is used to calculate a value set corresponding to each data record by using said data record as input, the matrix set comprising at least one processing parameter matrix, the value set comprising at least one calculation value, the distributed database computer system comprising the plurality of processing units connected in a share-nothing parallel processing architecture, wherein each processing unit comprises a processor of the each processing unit, a processor memory of the each processing unit, and a storage memory of the each processing unit, wherein the arbitrary matrix is stored in the distributed database in a way that one row of the arbitrary matrix is stored in each storage memory, wherein the data records and the matrix set are stored in a distributed database using the storage memories, each processor is operable for executing user defined functions (UDFs), calculating the value set corresponding to only one data record at a time, executing transaction processing, storing data in the processor memory, and using the data stored in the processor memory for execution of the UDFs within a framework of one transaction; and perform transaction processing in a framework of one transaction by: executing a first UDF on each processing unit, wherein a Cartesian product of the each processing parameter matrix and the row of the arbitrary matrix is calculated on each processing unit and as a result thereof the matrix set is stored in the processor memory of each processing unit; and executing a second UDF on each processing unit having at least one data record after the executing of the first UDF, wherein a number of repetitive executions of the second UDF on each processing unit is equal to the number of the data records stored in the storage memory of the each processing unit and all data records stored in the storage memory of the each processing unit are processed one by one, wherein the value set corresponding to the data record is calculated using the matrix set stored in the processor memory of said respective processing unit, wherein the matrix set is used to calculate the value set corresponding to each data record by using said data record as input of a link function of a generalized linear model;

wherein the at least one processing parameter matrix of the matrix set includes at least the following set of processing parameter matrices: a predictor-to-parameter correlation matrix and a beta coefficient matrix, wherein the predictor-to-parameter correlation matrix determines a correlation between each calculation value of the value set and a corresponding data record in said link function, wherein the predictor-to-parameter correlation matrix comprises rows of the predictor-to-parameter correlation matrix and each row of the predictor-to-parameter correlation matrix is used in conjunction with a corresponding beta coefficient of the beta coefficient matrix in said link function.

8. The computer program product of claim 7, wherein the matrix set is used to calculate the value set corresponding to each data record by using said data record as input of a link function of a generalized linear model, wherein the matrix set comprises the following processing parameter matrices:

a metadata matrix, a predictor-to-parameter correlation matrix, and a beta coefficient matrix, wherein the metadata matrix determines a type of the link function and a distribution function used in said link function, the predictor-to-parameter correlation matrix determines a correlation between each calculation value of the value set and a corresponding data record in said link function, wherein the predictor-to-parameter correlation matrix comprises rows of the predictor-to-parameter correlation matrix and each row of the predictor-to-parameter correlation matrix is used in conjunction with a corresponding beta coefficient of the beta coefficient matrix in said link function.

9. The computer program product of claim 7, wherein the distributed database is a Standard Query Language (SQL) distributed database, wherein the first UDF is one or more first SQL UDFs, wherein the second UDF is a second SQL UDF, wherein each first SQL UDF is performed by cross joining of the arbitrary matrix with one or more processing parameter matrices within a SQL query of the each first SQL UDF, wherein the second SQL UDF is performed by querying the data record in the distributed database within a SQL query of the second SQL UDF and after the querying of the data record in the distributed database causing the processor of the processing unit to calculate the value set corresponding to said data record within said SQL query of the second SQL UDF, wherein said processing unit comprises the storage memory comprising said data record.

10. The computer program product of claim 7, wherein the matrix set is used to calculate the value set corresponding to each data record by using said data record as input of link functions, wherein each link function is a link function of a unique generalized linear model, wherein each link function generates a corresponding portion of calculation values of the value set, wherein the matrix set comprises the following sets of processing parameter matrixes: a metadata matrix set, a predictor-to-parameter correlation matrix set, and a beta coefficient matrix set, wherein the metadata matrix set comprises at least one metadata matrix, wherein the predictor-to-parameter correlation matrix set comprises at least one predictor-to-parameter correlation matrix, wherein the beta coefficient matrix set comprises at least one beta coefficient matrix, wherein each generalized linear model has a unique combination of one metadata matrix of the metadata matrix set, one predictor-to-parameter correlation matrix of the predictor-to-parameter correlation matrix set, and one beta coefficient matrix of the beta coefficient matrix set, wherein the one metadata matrix of each generalized linear model determines a type of the link function of the each generalized linear model and a distribution function used in the link function of the each generalized linear model, wherein the one predictor-to-parameter correlation matrix of each generalized linear model determines a correlation between each calculation value of the portion of the calculation values and a corresponding data record in the link function of the each generalized linear model, wherein the one predictor-to-parameter correlation matrix of each generalized linear model comprises rows of said the predictor-to-parameter correlation matrix and each row of said the predictor-to-parameter correlation matrix is used in conjunction with a corresponding beta coefficient of a beta coefficient matrix of the each generalized linear model in the link function of the each generalized linear model.

11. The computer program product of claim 7, wherein the data records are linear arrays of data values.

12. The computer program product of claim 7, wherein the at least one processing parameter matrix is a linear array of processing parameter values.

13. A computer system for distributed processing of data on a distributed database computer system, the computer system comprising:
a memory; and
a processor, communicatively coupled to said memory, the computer system configured to perform a method comprising: distributing rows of an arbitrary matrix to all of a plurality of processing units, wherein a number of the rows is equal to a number of the processing units, wherein a matrix set is used to calculate a value set corresponding to each data record by using said data record as input, the matrix set comprising at least one processing parameter matrix, the value set comprising at least one calculation value, the distributed database computer system comprising the plurality of processing units connected in a share-nothing parallel processing architecture, wherein each processing unit comprises a processor of the each processing unit, a processor memory of the each processing unit, and a storage memory of the each processing unit, wherein the arbitrary matrix is stored in the distributed database in a way that one row of the arbitrary matrix is stored in each storage memory, wherein the data records and the matrix set are stored in a distributed database using the storage memories, each processor is operable for executing user defined functions (UDFs), calculating the value set corresponding to only one data record at a time, executing transaction processing, storing data in the processor memory, and using the data stored in the processor memory for execution of the UDFs within a framework of one transaction; and
performing transaction processing in a framework of one transaction by: executing a first UDF on each processing unit, wherein a Cartesian product of the each processing parameter matrix and the row of the arbitrary matrix is calculated on each processing unit and as a result thereof the matrix set is stored in the processor memory of each processing unit; and
executing a second UDF on each processing unit having at least one data record after the executing of the first UDF, wherein a number of repetitive executions of the second UDF on each processing unit is equal to the number of the data records stored in the storage memory of the each processing unit and all data records stored in the storage memory of the each processing unit are processed one by one, wherein the value set corresponding to the data record is calculated using the matrix set stored in the processor memory of said respective processing unit, wherein the matrix set is used to calculate the value set corresponding to each data record by using said data record as input of a link function of a generalized linear model;
wherein the at least one processing parameter matrix of the matrix set includes at least the following set of processing parameter matrices: a predictor-to-parameter correlation matrix and a beta coefficient matrix, wherein the predictor-to-parameter correlation matrix determines a correlation between each calculation value of the value set and a corresponding data record in said link function, wherein the predictor-to-parameter correlation matrix comprises rows of the predictor-to-parameter correlation matrix and each row of the predictor-to-parameter correlation matrix is used in conjunction with a corresponding beta coefficient of the beta coefficient matrix in said link function.

14. The computer system of claim 13, wherein the matrix set further comprises the following processing parameter matrix: a metadata matrix, wherein the metadata matrix determines a type of the link function and a distribution function used in said link function.

15. The computer system of claim 13, wherein the distributed database is a Standard Query Language (SQL) distributed database, wherein the first UDF is one or more first SQL UDFs, wherein the second UDF is a second SQL UDF, wherein each first SQL UDF is performed by cross joining of the arbitrary matrix with one or more processing parameter matrices within a SQL query of the each first SQL UDF, wherein the second SQL UDF is performed by querying the data record in the distributed database within a SQL query of the second SQL UDF and after the querying of the data record in the distributed database causing the processor of the processing unit to calculate the value set corresponding to said data record within said SQL query of the second SQL UDF, wherein said processing unit comprises the storage memory comprising said data record.

16. The computer system of claim 13, wherein the matrix set is used to calculate the value set corresponding to each data record by using said data record as input of link functions, wherein each link function is a link function of the generalized linear model, wherein each link function generates a corresponding portion of calculation values of the value set, wherein the matrix set comprises the following sets of processing parameter matrices: a metadata matrix set, a predictor-to-parameter correlation matrix set, and a beta coefficient matrix set, wherein the metadata matrix set comprises at least one metadata matrix, wherein the predictor-to-parameter correlation matrix set comprises at least one predictor-to-parameter correlation matrix, wherein the beta coefficient matrix set comprises at least one beta coefficient matrix, wherein each generalized linear model has a unique combination of one metadata matrix of the metadata matrix set, one predictor-to-parameter correlation matrix of the predictor-to-parameter correlation matrix set, and one beta coefficient matrix of the beta coefficient matrix set, wherein the one metadata matrix of each generalized linear model determines a type of the link function of the each generalized linear model and a distribution function used in the link function of the each generalized linear model, wherein the one predictor-to-parameter correlation matrix of each generalized linear model determines a correlation between each calculation value of the portion of the calculation values and a corresponding data record in the link function of the each generalized linear model.

17. The computer system of claim 13, wherein the data records are linear arrays of data values.

18. The computer system of claim 13, wherein the at least one processing parameter matrix is a linear array of processing parameter values.

* * * * *

UNITED STATES PATENT AND TRADEMARK OFFICE
CERTIFICATE OF CORRECTION

PATENT NO. : 10,482,154 B2
APPLICATION NO. : 14/514795
DATED : November 19, 2019
INVENTOR(S) : Pawel Cichosz et al.

Page 1 of 1

It is certified that error appears in the above-identified patent and that said Letters Patent is hereby corrected as shown below:

On the Title Page

Item [72], should read as follows:
... PAWEL CICHOSZ, Warsaw (PL);
CEZARY DENDEK, Warsaw (PL);
MICHAL DRAMINSKI, Warsaw (PL);
MIECZYSLAW KLOPOTEK, Mazowiecki (PL);
KRZYSZTOF SKOWRONSKI, Brwinow (PL) ...

Signed and Sealed this
Second Day of June, 2020

Andrei Iancu
*Director of the United States Patent and Trademark Office*